US011865571B2

(12) United States Patent
Rattray et al.

(10) Patent No.: US 11,865,571 B2
(45) Date of Patent: Jan. 9, 2024

(54) DIE COATING ON AIR SUPPORTED SHELL

(71) Applicant: 3M INNOVATIVE PROPERTIES COMPANY, St. Paul, MN (US)

(72) Inventors: Tyler J. Rattray, Woodbury, MN (US); Mikhail L. Pekurovsky, Bloomington, MN (US); Shawn C. Dodds, St. Paul, MN (US); Samad Javid, Woodbury, MN (US); James N. Dobbs, Woodbury, MN (US); Kara A. Meyers, Oakdale, MN (US); Ronald P. Swanson, St. Paul, MN (US); Robert B. Secor, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/757,468

(22) PCT Filed: Dec. 22, 2020

(86) PCT No.: PCT/IB2020/062352
§ 371 (c)(1),
(2) Date: Jun. 16, 2022

(87) PCT Pub. No.: WO2021/137103
PCT Pub. Date: Jul. 8, 2021

(65) Prior Publication Data

US 2023/0001442 A1 Jan. 5, 2023

Related U.S. Application Data

(60) Provisional application No. 62/955,585, filed on Dec. 31, 2019.

(51) Int. Cl.
*B05C 5/02* (2006.01)
*D21G 3/00* (2006.01)

(52) U.S. Cl.
CPC ........... *B05C 5/0245* (2013.01); *D21G 3/005* (2013.01)

(58) Field of Classification Search
USPC ...... 118/419, 420, 427, 428; 427/356, 430.1
See application file for complete search history.

(56) References Cited

U.S. PATENT DOCUMENTS 5,246,155 A 9/1993 Barrois et al.
5,706,731 A 1/1998 Francille et al.
(Continued)

FOREIGN PATENT DOCUMENTS

EP 0855268 B1 6/2001
JP 4944108 B1 11/1974
WO 2020121121 A1 6/2020

OTHER PUBLICATIONS

Gates, "Slot Coating Flows: Feasibility, Quality—vol. I", A Thesis submitted to the Faculty of the Graduate School of the University of Minnesota, Aug. 1999, pp. 1-581.
(Continued)

*Primary Examiner* — Yewebdar T Tadesse
(74) *Attorney, Agent, or Firm* — Thomas M. Spielbauer

(57) ABSTRACT

Methods and apparatuses for applying coatings on a moving web are provided. A coating die and a back-up roll engage with each other. The back-up roll includes a shell rotatably supported by a pressurized air layer. When a coating material is dispensed from the coating die onto the web to form a liquid coating, the pressure of the air layer is controlled such that the shell translates in space to balance forces from the air layer and the coating bead, while the web is being translated to drive the shell.

16 Claims, 5 Drawing Sheets

(56) References Cited

U.S. PATENT DOCUMENTS

| | | | | |
|---|---|---|---|---|
| 7,713,579 | B2 * | 5/2010 | Ogawa | B05C 5/0254 118/200 |
| 7,846,504 | B2 | 12/2010 | Maier et al. | |
| 2011/0067234 | A1 | 3/2011 | Theis et al. | |
| 2011/0171376 | A1 * | 7/2011 | Yasuda | G05D 7/0186 118/419 |

OTHER PUBLICATIONS

International Search Report for PCT International Application No. PCT/IB2020/062352, dated on Apr. 20, 2021, 4 pages.

Nam, "Analysis of Tensioned-Web-Over-Slot Die Coating", A Dissertation submitted to the Faculty of the Graduate School of the University of Minnesota, Dec. 2009, pp. 1-352.

* cited by examiner

DIE COATING ON AIR SUPPORTED SHELL

CROSS REFERENCE TO RELATED APPLICATIONS

This application is a national stage filing under 35 U.S.C. 371 of PCT/IB2020/062352, filed Dec. 22, 2020, which claims the benefit of U.S. Application No. 62/955,585, filed Dec. 31, 2019, the disclosure of which is incorporated by reference in its/their entirety herein.

BACKGROUND

Slot dies have been widely used as a coating device for applying coating on a web. One typical type of die coating configuration is to apply coating material on a moving web by coating against a back-up roll.

SUMMARY

There is a desire to improve coating uniformity when applying a coating on a moving web via a coating die against a back-up roll. For example, as the thickness of coated material decreases (e.g., 50 micrometers or less), the gap between a coating die and the back-up roll needs to become smaller (e.g., a gap less than 100 micrometers). Also, the gap needs to be more uniform (e.g. a gap that varies by less than 5 micrometers both spatially and temporally during coating). This increased precision requirement places a practical limit on the ability to produce thin coatings (e.g., 50 micrometers or less). The present disclosure provides methods and apparatuses of applying a uniform coating on a web via a coating die over a back-up roll having an air supported shell. Some embodiments of the present disclosure are specifically efficient to apply uniform thin coating of liquids with low viscosity on webs.

Briefly, in one aspect, the disclosure describes a method of applying a coating onto a web. The method includes providing a roll comprising a shell rotatably supported by at least one pressurized air layer between the shell and a core; providing a coating die including one or more die lips being positioned adjacent an outer surface of the shell of the roll; and dispensing one or more coating materials from the one or more die lips of the coating die onto the web to form a coating, while translating the web in contact with the shell of the roll to rotate the shell. Fluid pressure can be generated in the coating bead due to the confinement of the fluid and the motion of the web. An air flow rate supplied to the core to form the at least one pressurized air layer can be adjusted such that the shell can deform and/or translate in space to balance forces from the pressurized air layer and the coating bead.

In another aspect, this disclosure describes a coating apparatus including a roll comprising a shell rotatably supported by at least one pressurized air layer between the shell and a core; a coating die comprising one or more die lips being positioned adjacent an outer surface of the shell of the roll; a flexible web disposed between the roll and the coating die; and a web path to translate the web in contact with the outer surface of the shell of the roll to rotate the shell. One or more coating materials are disposed from the one or more die lips of the coating die onto the flexible web to form a coating, while the web is being translated.

Various unexpected results and advantages are obtained in exemplary embodiments of the disclosure. One such advantage of exemplary embodiments of the present disclosure is that a shell is supported by at least one pressurized air layer where the air pressure is controlled such that the shell can deform and/or translate in space to balance forces from the air layer and the coating bead to obtain coatings of lower viscosities with lower coat weights.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying drawings, in which.

Figure 1:
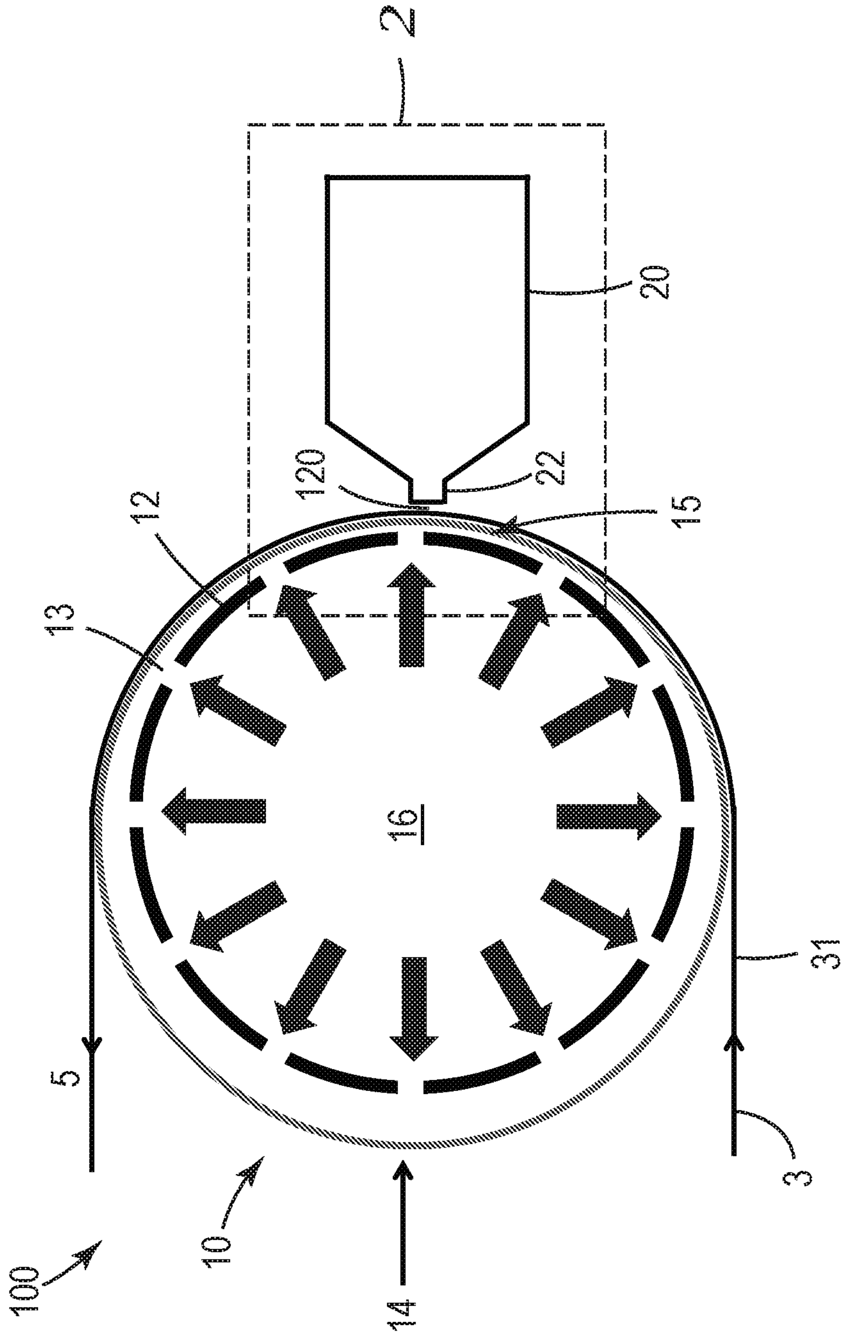
FIG. 1 is a perspective view of a coating apparatus applying coating on a moving web, according to one embodiment.

In the drawings, like reference numerals indicate like elements. While the above-identified drawings, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that:

In this application, the term "coating die" or "die coating" refers to a system or a method of dispensing a fluid coating material (e.g., a liquid coating material) from a die body thereof to a web. The die coating described herein is a pre-metered coating process in which the amount of coating material applied to the web per unit area is substantially predetermined by a metering device upstream, such as, for example, a precision gear pump. Typical die coating methods and systems are described in, e.g., Ian D. Gates, Slot Coating Flows: Feasibility, Quality, PhD Thesis, 1999, University of Minnesota.

The term "air layer" refers to a pressurized gas (e.g., air) layer that creates an air gap between two surfaces to provide a low or no friction interface between a static element, such as a rigid core, and a rotating element, such as a thin metal shell.

The terms "coating material," "liquid," "liquid material," or "liquid coating material" refer to any materials flowable at coating operation conditions described herein.

In this application, the terms "polymer" or "polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

In this application, by using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate (e.g., web). However, unless otherwise indicated, it is not intended that the substrate (e.g., web) or articles should have any particular orientation in space during or after manufacture.

In this application, by using the term "overcoated" to describe the position of a layer with respect to a substrate (e.g., web) or other element of an article of the present disclosure, we refer to the layer as being atop the substrate (e.g., web) or other element, but not necessarily contiguous to either the substrate (e.g., web) or the other element.

In this application, the term "machine direction" refers to the direction in which the web travels. Similarly, the term "cross-web" refers to the direction perpendicular to the machine direction (i.e. perpendicular to the direction of travel for the web), and in the plane of the top surface of the web.

In this application, the terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

In this application, the term "substantially" with reference to a property or characteristic means that the property or characteristic is exhibited to a greater extent than the opposite of that property or characteristic is exhibited. For example, a substrate (e.g., web) that is "substantially" transparent refers to a substrate (e.g., web) that transmits more radiation (e.g. visible light) than it fails to transmit (e.g. absorbs and reflects). Thus, a substrate (e.g., web) that transmits more than 50% of the visible light incident upon its surface is substantially transparent, but a substrate (e.g., web) that transmits 50% or less of the visible light incident upon its surface is not substantially transparent.

In this application, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this application, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the specification and more particularly the Listing of Exemplary Embodiments and the claims can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but are to be controlled by the limitations set forth in the claims and any equivalents thereof.

Methods and apparatuses are described herein for die coating on a moving substrate. In a coating process described herein, a flexible web is disposed between a back-up roll and a slot die. The back-up roll includes an outer shell rotatably supported by at least one pressurized air layer, which is provided between the outer shell and an air core. The outer shell can float on the layer of pressurized air, deform and/or translate in space with respect to the core. The flexible web can wrap around the back-up roll and move to rotate the outer shell of the back-up roll.

The uniformity of a liquid coating may be impacted by a combination of many sources of imperfections and may result in variations in the appearance and amount of the coating that adheres to a substrate. The present disclosure addresses some issues that might impact the coating uniformity. In some embodiments, the average amount of the applied liquid coating can be metered by a solution handling system, which can be proportioned to the speed and width of the flexible web that is to be coated. The thickness variation in the cross-web direction of the applied liquid coating can be controlled by the performance of the die cavity, which shapes flow from a feed pipe into a sheet that emerges from a die slot. The thickness uniformity in the cross-web direction is referred to as the cross-web coating profile. A substantially flat profile means a substantially uniform coating thickness. The cross-web coating profile can also be a function of the pressure in the coating bead and the gap between the coating die and the back-up roll. In some embodiments, the thickness uniformity in the down-web direction can be controlled by solution handling (e.g., to control a down-web coating thickness variation due to the variation in the flowrate delivered by a pumping system) and web handling (e.g., to control a down-web coating thickness variation due to variation in the speed of a substrate). The thickness uniformity in the down-web direction is referred to as the down-web coating profile. In the present disclosure, the coating profile can be controlled such that both the cross-web coating profile and the down-web coating file are substantially uniform or flat over time.

In some cases, factors other than the performance of the solution handling, the die cavity and/or the web handling, may also affect the uniformity or flatness of the coating profile. For example, nonuniformities in the coating bead may create visible localized defects in the applied coating such as those brought on by entrainment of air between the coating and the web, break-up of the continuous coating bead into rivulets or repeating cross web bands, and/or surface roughness in the coated substrate. These discontinuities and nonuniformities in the coating are generally referred to as coating defects.

In addition, coating defects may be produced by imperfections in a back-up roll. For example, when a coating die is positioned against a back-up roll, the back-up roll may deviate significantly from an ideal cylinder, as indicated by a total indicated runout (TIR). A TIR refers to the difference between the largest and smallest values of the radius on the roll. The requirement for a low TIR (e.g., less than 1 micrometer) back-up roll can significantly increase the cost and complexity of a slot die coating system with a back-up roll. When a coating die is positioned against a free-span of the web, it also might have problems. For example, in that case, baggy lanes in the substrate may lead to coating defects as the web bagginess can lead to low bead pressure in the area of web bagginess, resulting in non-uniform liquid flow out of the coating die.

Figure 2:
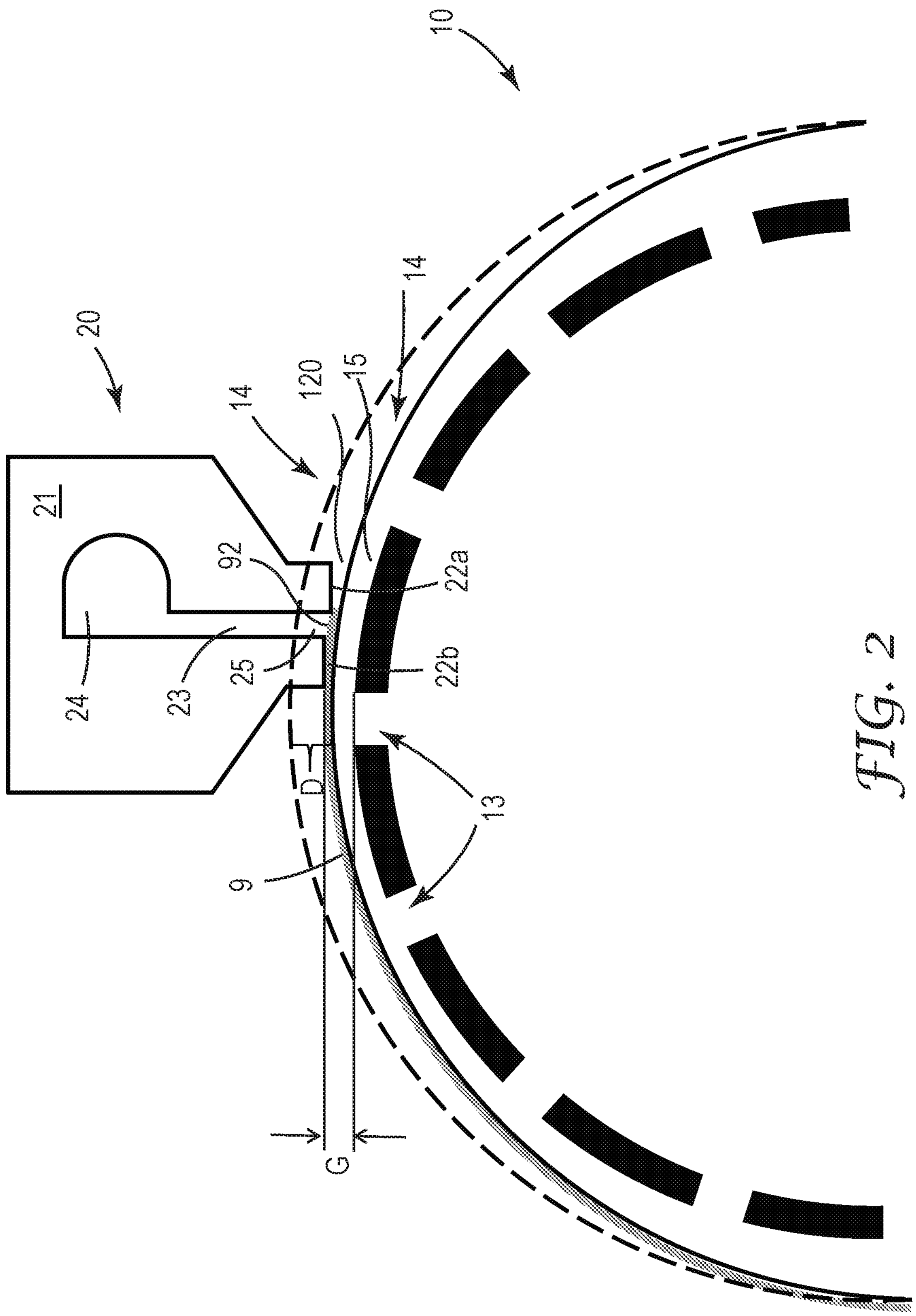
FIG. 2 is an enlarged portion view of FIG. 1, according to one embodiment.
Figure 2A:
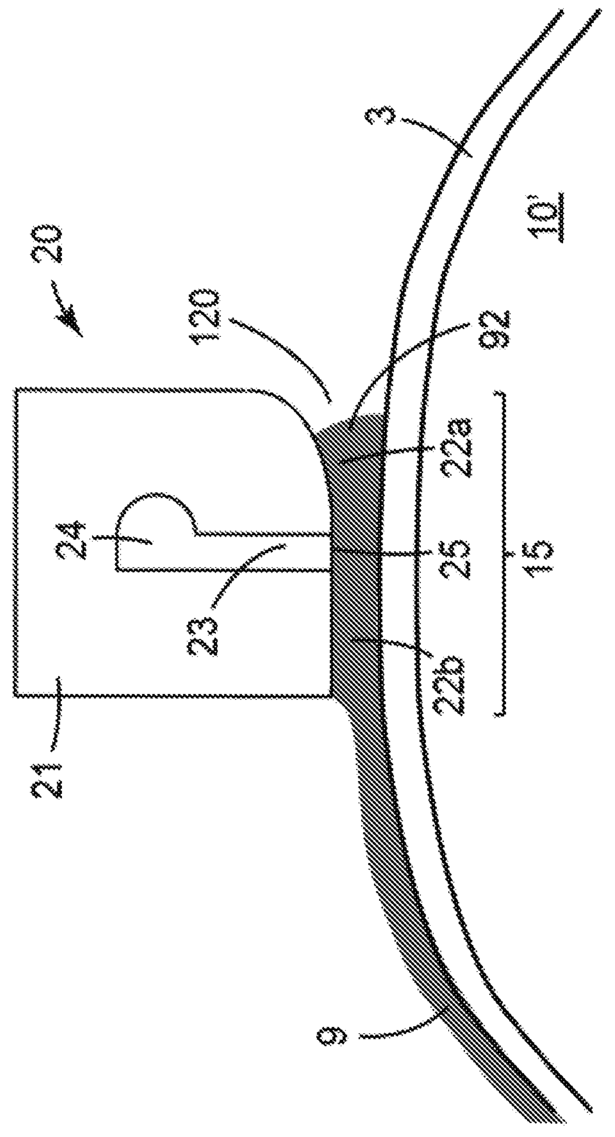
FIG. 2A' is an enlarged portion view of a coating apparatus including a rigid back-up roll.

In some cases, producing coatings with a wet thickness of about 50 micrometers or less can be challenging when using a coating die. To produce such a thin coating against a rigid back-up roll such as shown in FIG. 2A', a slot die 20 may be positioned at a very close proximity to the rigid back-up roll 10' (e.g., with a gap between the die lip and the roll surface less than 100 micrometers), and therefore requires increasing precision not just in the positioning system, but also in the uniformity of the die and roll surfaces, and this quickly becomes impractical.

PCT Application No. PCT/IB2019/060411, Dodds et al.) describes slot die coating over deformable back-up roll, which is incorporated herein by reference. As the viscosity of the coating material decreases, softer and softer back-up roll surfaces are required for the system to be effective to apply a thin (e.g., 50 micrometers or less) and uniform coating material onto a moving web. The increased softness of the back-up roll surface may limit the range of viscosity and thicknesses of coating that can be uniformly applied onto a moving web.

A free-span coating does not use a back-up roll, and in theory one may be able to position the web arbitrarily closely to the slot die, and so produce arbitrarily thin coatings. In practice, a free-span coating may require increasingly accurate control of the tension and thickness of the substrate upon which the coating is applied, as these parameters and web bagginess can lead to changes in the pressure in the coating bead, and therefore variations in the local thickness of the coating.

For a die coating process, it is often possible to define a coating window, i.e. a range of parameters in which it is possible to achieve an acceptable coating. This window may in general be a function of the properties of the liquid coating solution (viscosity, surface tension, etc.), as well as the mechanical configuration of the coating system (line speed, die geometry, etc.). An example of a limit to the coating window may be defined as the low-flow limit. In this configuration the flowrate of the liquid coating solution may not match the rate of liquid uptake by the web, and so the upstream coating bead becomes unstable. When coating in free span this defect may be eliminated by increasing the tension in the web, though there are typically machine limitations to increasing the tension beyond a certain value (e.g., 2 lbs per inch of cross-web width). When coating with a slot die against a back-up roll, the low-flow limit may be eliminated by decreasing the distance between the slot die and the web, though there are again machine limitations to this approach, such as the precision with which that distance can be maintained, both temporally and spatially.

Methods and apparatuses are described herein for a die coating apparatus and method which can address the above described issues. In some embodiments of the present disclosure, a coating apparatus including a back-up roll comprising a shell rotatably supported by at least one pressurized air layer can be used, which allows the web to lay against the back-up roll, diminishing the impact of web bag as compared to free-span coating, while also allowing the back-up roll to deflect under the pressure in the coating bead, diminishing the impact of any nonuniformities in the back-up roll as compared to coating against a rigid back-up roll.

While not to be bound by theory, by using a shell that is rotatably supported on a layer of pressurized air between the shell and the core, the position of the shell relative to the coating die and the core may adjust to balance the force applied by the coating bead with the force applied by the air layer. Therefore, the elimination of coating defects such as the low-flow limit may be possible by simply adjusting the flow of air into the core, and thus the pressure of the pressurized air layer. Coating defects such as the low-flow limit may therefore be addressed without needing to alter the position of the coating die relative to the fixed axis of the backup roll (as would be the case when coating against a backup roll), or without adjusting the web tension (as would be the case when coating in free-span). The overall uniformity of the coating may be set by, for example, the mechanical uniformity of the core and the shell, and the consistency of the flowrate of air supplied to form the pressurized air layer.

Some embodiments of the present disclosure can further address variation of coating thickness due to a splice. When changing from a first input roll of substrate to a second input roll of substrate, it is common to tape the trailing end of the first input roll of substrate to the leading edge of the second input roll of substrate, producing what is commonly referred to as a splice. In practice, this produces a significant thickness variation in the substrate at the location of the splice, due to the thickness of any tape used to hold the two substrates together, as well as due to any overlap between the two layers of substrate. When coating with a slot die against a rigid back-up roll, this may force the coating practitioner to temporarily increase the gap between the slot die and the rigid back-up roll so that the splice does not get stuck at the slot die, which typically may result in the web breaking and would therefore lead to a significant interruption in the coating operation. This may not typically be a problem when coating in free span, since there is no back-up roll to trap the splice. In the present disclosure, a rigid back-up roll is replaced with a back-up roll including a shell that is rotatably supported on a layer of pressurized air, and the splice can pass through the gap between the coating die and the back-up roll shell without tearing the splice due to translation of the shell and self-adjustment of the pressurized air layer supporting the shell.

Various exemplary embodiments of the disclosure will now be described with particular reference to the Drawings. Referring now to FIG. 1, a perspective view of a coating apparatus 100 for applying a liquid coating on a moving web 3 via a coating die 20 over a back-up roll 10, according to some embodiments. FIG. 2 illustrate an enlarged portion view of the coating apparatus 100 in FIG. 1.

The coating apparatus 100 includes a back-up roll 10 and a slot die 20. The slot die 20 has a die lip 22 that engages with the back-up roll 10 to form a coating zone 120. In the depicted embodiment of FIG. 2, the die lip 22 includes an upstream lip 22*a* and a downstream lip 22*b* which provide an upstream coating surface at 22*a* and a downstream coating surface at 22*b*, respectively. A flexible web 3 of indefinite length material is conveyed in a machine direction 5 into the coating zone 120. It is to be understood that the web may not be limited to the specific wrap angles as it enters/exits the coating zone 120 shown schematically in FIG. 1. Also, the position of the die 20 relative to the back-up roll 10 may not be limited to what is depicted in FIG. 1.

As shown in FIG. 1 or 2, the slot die 20 includes a die body 21 defining an internal manifold 24. The die lip 22 of the slot die 20 has an opening 25 in fluid communication with the internal manifold 24 via a slot channel 23. The die lip 22 is positioned proximate to the back-up roll 10 and extends along a cross direction of the web 3. A coating material is provided to the internal manifold 24, flows through the slot channel 23, and is dispensed from the opening 25. The die lip 22 of the slot die 20 provides a coating surface (e.g., a surface of the upstream die lip portion 22*a*, and/or a surface of the downstream die lip portion 22*b*) that is engaged with flexible web 3 (not shown in FIG. 2 for simplicity) wrapped around the back-up roll 10. When the coating material is dispensed from the slot die 20 onto the flexible web 3, a liquid layer or coating bead 92 is present between the coating surface of the slot die 20 and the flexible web 3.

In the embodiment depicted in FIG. 1, the back-up roll 10 is provided by mounting a shell 14 on an air layer to be rotatably supported by at least one pressurized air layer 15. The shell 14 can be built out of metals, combination of layers of metals, from composite materials that include PAN carbon fibers, pitch carbon fibers, para-aramid fibers, Kevlar fibers, and glass fibers, or from combination of layers of metals and polymeric materials, for example elastomers like rubbers. These fiber-based materials are impregnated with polymeric materials that could include epoxies, polyesters, and vinylesters. Examples of metals suitable for building shells include nickel, copper, nickel/cobalt, titanium, and aluminum. A thin shell of carbon composite is also believed to be suitable for use as a shell.

In some embodiments, the shell 14 can be composed primarily of nickel. For example, a shell composed of nickel having a thickness of between about 3 mils (0.076 mm) and 15 mils (0.381 mm), or even between about 4 mils (0.102 mm) to 6 mils (0.152 mm), has been found to be suitable. A nickel (with a density of 0.322 lb/in^3 equivalent to 8 908 kg/m^3) shell with a length of 15 inches (38.1 cm) and thickness of 10 mil and an outer diameter of 8.7 inches (22.1 cm) has a rotational moment of inertia of about 24.88 lb–in^2 (72.65 Kg cm^2).

Rotational moment of inertia for a thin shell can be calculated by a simplified formula: $I=MR^2$, where M is mass of the shell, and R is the radius of the shell. A 5 mil thick, 10 inch diameter, 10 inch long nickel shell has a rotational moment of inertia 12.62 lb in$^2$ (36.84 Kg cm$^2$), while 5 mil thick, 20 inch diameter, 10 inch long shell has a rotational moment of inertia 101.03 lb in$^2$ (295 Kg cm$^2$). Rotational moment of inertia is linearly proportional to the length of the shell, linearly proportional to the thickness of the shell when thickness of the shell is generally less than 1/100th of the radius of the shell, and proportional to the cube of the radius of the shell when thickens of the shell is generally less than 1/100th of the radius of the shell.

Shells with lower rotational moment of inertia may be advantageous where the rotational inertia of the shell is affecting acceleration and deacceleration of the sleeve driven by a substrate, e.g., the moving web 3 The shell 14 is not connected to a drive and freely rotates about its axis. While different diameter and/or length shells can be used, the rotational moment of inertia of the shell can be less than 150, 100, 50, or 30 lb–in$^2$ (438, 292, 146, or 87.6 Kg–cm$^2$) in various embodiments of the disclosure.

In the embodiment depicted in FIG. 1, the shell 14 is mounted on a core 12 having apertures 13 for the egress of an airflow that forms the pressurized air layer 15 to rotationally supports the shell 14. The embodiment of FIG. 1 uses an external pressurized air source to provide air supply into the inner manifold 16. That air is introduced between the surfaces by holes, grooves, porous elements, or steps. Air can also be supplied though the entire surface of the core 12. Porous cores can be made of porous metals, porous plastics, and other porous materials, like porous carbon. Heaters or coolers may be placed in or adjacent to the core 12 or the air supply to add or remove heat from the sleeve 14 if desired to control the temperature of the moving web 3 that is in contact with the sleeve 14.

When the shell 14 is mounted, the shell 14 can float on the surface of the core 12 using air pressure. An annular air gap g is present between the inner diameter of the shell 14 and the out diameter of the core 12. The core 12 has a pattern of apertures 13 drilled through it which connect the gap to the inner manifold 16 which can be fed by, e.g., an air blower. It is to be understood that the pattern of apertures 13 may have various configurations. For example, the apertures 13 can be separated by any acceptable distance in both the axial and circumferential directions. The pattern of apertures 13 may be uniformly spaced (as shown in FIGS. 1 and 2) or nonuniformly spaced. The dimension of the air gap depends on the dimensions of the shell 14 and the outer surface of the core 12. In some embodiments, the annular air gap may have an average thickness (the air gap may not be constant when shell is mounted on the core due to gravity) in the range of, for example, from about 5 micrometers to about 1 mm, or from about 10 micrometers to about 0.5 mm, measured as a distance in the radial direction between the inner diameter of the shell 14 and the outer diameter of the core 12.

Figure 3A:
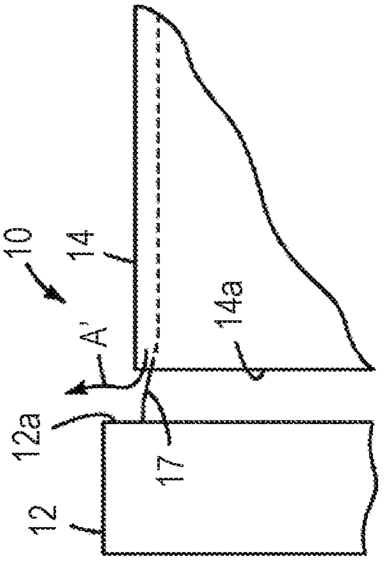
FIG. 3A is a partial front view of a roll apparatus, according to another embodiment.
Figure 3B:
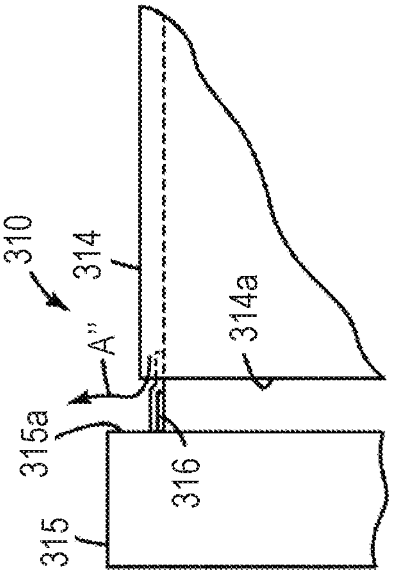
FIG. 3B is a partial front view of a roll apparatus, according to another embodiment.
Figure 3:
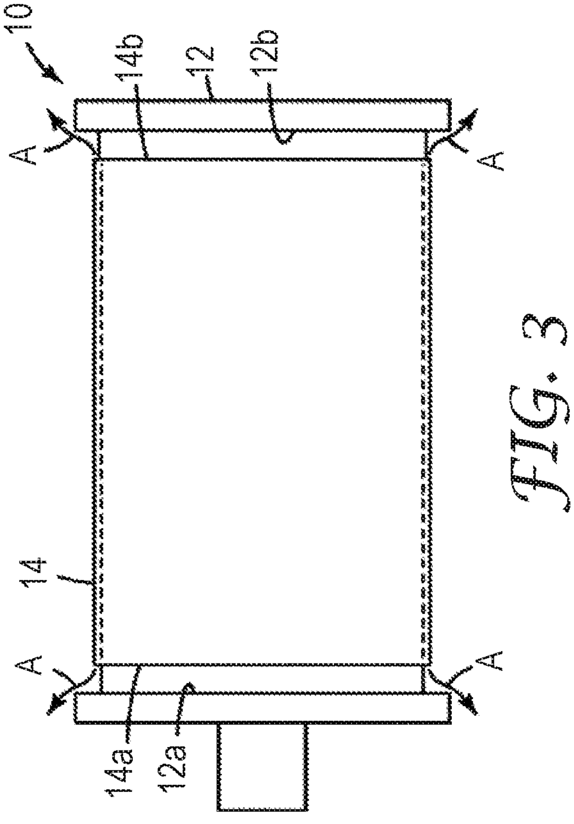
FIG. 3 is a front view of a portion of the apparatus of FIG. 1, according to one embodiment.

In the embodiment of FIG. 3, the air core 12 includes a cylindrical core having a plurality of holes arranged about the core's periphery, and circular end caps disposed at the opposite ends of the cylindrical core. A source of compressed gas is supplied to the cylindrical supporting core 12, which flows out of the holes thereby allowing rotation of the thin shell 14 about the core 12. Airflow from the air core 12 emerging from the lateral edges 14*a* and 14*b* of the thin shell 14 is indicated by arrows "A." The width of the thin shell 14 is such that the shell fits within the lateral edges 12*a* and 12*b* of air core 12. In the depicted embodiment, thin shell 14 may "wander" laterally, at least to some extent, within the confines of the lateral edges 12*a* and 12*b* of air core 12.

Referring now to FIG. 3*a*, a sectional view of another embodiment of back-up roll 10 useful in the present disclosure is shown and will now be described. As described in the foregoing embodiment, thin metal shell 14 is mounted on air core 12. Airflow from the air core 12 emerges from underneath the metal shell 14 along the lateral edges of the shell as indicated by arrows “A'.” The width of the thin shell 14 is such that it the shell fits within the lateral edges of air core 12. Tapered shoulder 17 is provided on the cylindrical core near lateral edge 12*a* of air core 12. It will be appreciated that a similar tapered shoulder is provided on the opposite side (not shown) of air core 12. In this manner, tapered shoulder 17 prevents thin metal shell 14 from laterally wandering between the edges of air core 12 and serves to balance forces exerted by lateral airflow A' emerging from the edges of the thin shell 14, thus keeping the thin shell centered on the air core.

Referring now to FIG. 3*b*, a sectional view of another embodiment of a backup roll 310 useful in the present disclosure is shown and will now be described. Thin metal shell 314 is mounted on air core 315. Airflow from the air core 315 emerges from underneath the metal shell 314 along the lateral edge 314*a* of the shell as indicated by arrows “A”.” The width of the thin shell 314 is such that it the shell fits within the lateral edges of air core 315. Stepped shoulder 316 is provided on the cylindrical core near lateral edge 315*a* of air core 315. It will be appreciated that a similar structure is provided on the opposite side (not shown) of air core 315. In this manner, stepped shoulder 316 prevents thin metal shell 314 from laterally moving between the edges of air core 315, serving to balance the forces exerted by lateral airflow A" emerging from lateral edges of the thin shell 314, keeping thin shell centered within the edges of the air core. In the foregoing embodiments, the shoulder structures depicted as tapered shoulder 17 (FIG. 3*a*) and stepped shoulder 316 (FIG. 3*b*) are exemplary of structures useful in the present disclosure to prevent excessive lateral movement of the thin metal shell within the confines of the air core. Other structures are contemplated within the scope of this disclosure to perform the same function and achieve the same result as the shoulders 17 and 316, and this disclosure is not to be construed as limited in any respect to the depicted shoulder structures.

Referring again to FIG. 1 or 2, when the slot die 20 is disposed adjacent to the shell 14 to apply coating onto the moving web 3, the die lip 22 of the slot die 20 and the shell 14 engage with each other via the coating bead 92 therebetween. As shown in FIG. 2, the shell 14 automatically deforms and/or translates in space with a radial displacement D from its resting position (the dotted line) to its coating position (the solid line) to balance the force of air from the air gap and the coating bead force. The radial displacement D is measured as a distance between the resting position and the coating position of the shell 4 along the radial direction for a central point where the die lip 22 engages the shell 4. When the die lip 22 and the shell 4 engage with each other, the air gap adjacent to the coating zone 120 decreases by the amount of the radial displacement D. An effective physical gap G can be measured as the radial distance between the die lip 22 and the outer surface of the core 12 for the central point where the die lip 22 engages the shell 4, after subtracting the thickness of the shell 4. The effective physical gap G is the sum of an effective coating gap $G_1$ between the die lips and the shell and the gap $G_2$ between the inner surface of the shell and the outer surface of the core.

In some embodiments, an air flow rate supplied to inner manifold 17 of the core 12 can be controlled to form the at least one pressurized air layer with desired properties (e.g., pressure, thickness, etc.). When the air flow rate is adjusted, the shell 14 can automatically deform and/or translate in space with an appropriate radial displacement D to adjust an effective coating gap between the die lips and the shell.

In the depicted embodiments, the die lip 22 provides an upstream coating surface at 22*a* and a downstream coating surface at 22*b*, separated by the opening 25, through which coating liquid is applied to the flexible web 3. The die lip 22 is typically in contact with the coating liquid and can take on various shapes. The die lip will have a length both upstream and downstream from the opening(s), and this length may be about 0.01 mm, 0.1 mm, 0.25 mm, 0.5 mm, 1 mm, 5 mm, or any other suitable number. The die opening may include one or more channels through which the coating fluid can flow towards the back-up roll, where the one or more channels are arranged in the machine direction (for example, the slot dies described in chapter 4 of Jaewook Nam, Analysis of Tensioned-Web-over-Slot Die Coating, PhD Thesis, 2009, University of Minnesota) or in the cross-web direction (for example, the slot dies described in U.S. Pat. No. 7,846,504). The width of the die opening may be, for example, 0.05 mm, 0.1 mm, 0.25 mm, or any other suitable number. In some embodiments, the die slot may also be angled relative to a radial projection of the back-up roll, with this angle being about 0 degrees, 2 degrees, 5 degrees, or 10 degrees, and with either positive or negative angles both being acceptable. It is to be understood that various configurations of slot die can be applied herein.

The die coating processes described herein can be premetered coating processes. In some embodiments, the coating apparatuses described herein can further include a pump and a control system for the pump. The pump can provide a predetermined flow rate of the fluid coating material into the internal manifold 24. The predetermined flow rate, along with other factors such as, for example, the web speed, can largely define the thickness of the coating layer. The pump can be, for example, a high bandwidth precision pump that is in fluid communication with an input port of the die body. The pump is configured to supply the coating material into the internal manifold 24 at an adjustable flow rate such that the coating material can be dispensed onto the moving web 3 through the die lip 22 to form a coating 9 with a desired thickness. In some embodiments, the coating thickness can be controlled in a range, for example, about 1 to about 500 micrometers.

The coating material can be any coatable material including, for example, water- or solvent-based solutions, primers, adhesives, inks, dispersions, emulsions, etc. The coating material may be Newtonian or non-Newtonian. In some embodiments, the coating solution may have a shear-sensitive viscosity or may shear thin and have a viscosity below about 100,000 centipoise (cP), optionally below about 10,000 cP. For example, a typical fluid may have a viscosity of about 10,000 cP at a shear rate of 10 l/s and a viscosity of about 3,000 cP at a shear rate of 2,000 l/s. The wet coating on the web can be dried, cured, or solidified to form a coating layer on the web.

As shown in FIG. 1 or 2, a uniform coating 9 is formed on the surface 31 of the web 3 that faces the slot die 20. A wet coating thickness refers to the coated thickness on the web immediately after the slot die. After drying, curing, or solidification, the coating thickness can be reduced. That reduction of coating thickness is due to a loss of volatile materials during drying, and/or shrinkage of the polymer. Curing can be accomplished by, for example, exposure of the coating to elevated temperature, or actinic radiation. Actinic radiation can be, for example, in the UV spectrum.

The flexible web 3 can include any suitable flexible substrate, such as, for example, a polymer web, a paper, a polymer-coated paper, a release liner, an adhesive coated web, a metal coated web, a flexible glass or ceramic web, a nonwoven, a fabric, or any combinations thereof. The flexible web 3 is disposed between the back-up roll 10 and the slot die 20, wrapping around the back-up roll 10 with various wrap angles. In some embodiments, the flexible web 3 can wrap the back-up roll 10 with a wrap angle in the range, for example, from about 1 to about 180 degrees, about 1 to about 120 degrees, about 1 to about 90 degrees, or about 1 to about 60 degrees.

As shown in FIG. 1 or 2, the slot die 20 is engaged into close proximity to the back-up roll 10 to form the coating zone 120, where the flexible web 3 (not shown in FIG. 2) is located on the outer surface of the sleeve 14 of the back-up roll 10. The coating liquid is supplied to the coating zone 120 via the slot die opening 23. Pressure can build between the slot die 20 and the flexible web 3 such that the sleeve 14 of the backup roll 10 translates in space to maintain an appropriate radial displacement D in the contacting area to balance the force of air to coating bead force. A contacting area might refer to the area where the die lips in combination with a coating material impart a force on the back-up roll.

The slot die 20 can apply a uniform pressure at the coating zone 120 across the web. The flexible web 3 can spread evenly along the cross-web direction over the outer surface of the shell 14. A non-baggy surface of the flexible web 3 can be formed when the web goes through the coating zone 120. Non-flatness characteristics can be significantly reduced in the web 3 on the wrapping area around the back-up roll 10. The coating material is applied to form an even coating 9 on the non-baggy surface of the web 3 that contacts the slot die 20. The non-flatness characteristics on the baggy web may restore after the flexible web 3 leaves the contact with the back-up roll 10, which may not affect the uniformity of the coating already formed on the web.

Listing of Exemplary Embodiments

Exemplary embodiments are listed below. It is to be understood that any one of the embodiments 1-10 and 11-16 can be combined.

Embodiment 1 is a method of coating a web, the method comprising:
- providing a roll comprising a shell rotatably supported by at least one pressurized air layer between the shell and a core;
- providing a coating die including one or more die lips being positioned adjacent an outer surface of the shell of the roll; and
- dispensing one or more coating materials from the one or more die lips of the coating die onto the web to form a coating, while translating the web in contact with the shell of the roll to rotate the shell.

Embodiment 2 is the method of embodiment 1, further comprises adjusting an air flow rate supplied to the core to form the at least one pressurized air layer.

Embodiment 3 is the method of embodiment 2, wherein the air flow rate is adjusted to adjust an effective coating gap between the die lips and the shell.

Embodiment 4 is the method of any one of embodiments 1-3, wherein the thickness of the coating is in the range from about 1 to about 500 micrometers.

Embodiment 5 is the method of any one of embodiments 1-4, further comprising metering a fluid flow through the coating die to control a wet thickness of the coating.

Embodiment 6 is the method of any one of embodiments 1-5, wherein the at least one pressurized air layer has an annular thickness in the range from about 10 micrometers to about 0.5 mm before the coating die and the roll engage with each other.

Embodiment 7 is the method of any one of embodiments 1-6, wherein the flexible web has one or more surface non-flatness characteristics.

Embodiment 8 is the method of embodiment 7, wherein the flexible web is a baggy web.

Embodiment 9 is the method of embodiment 7 or 8, wherein the one or more surface non-flatness characteristics includes a splice, a web thickness variation, or a web wrinkle.

Embodiment 10 is the method of any one of embodiments 1-9, further comprising wrapping the flexible web around the back-up roll.

Embodiment 11 is a coating apparatus comprising:
- a roll comprising a shell rotatably supported by at least one pressurized air layer between the shell and a core;
- a coating die comprising one or more die lips being positioned adjacent an outer surface of the shell of the roll;
- a flexible web disposed between the roll and the coating die; and
- a web path to translate the web in contact with the outer surface of the shell of the roll to rotate the shell,
- wherein one or more coating materials are disposed from the one or more die lips of the coating die onto the flexible web to form a coating, while the web is being translated.

Embodiment 12 is the coating apparatus of embodiment 11, wherein the flexible web wraps around the roll and the contact between the flexible web and the shell drives the shell while the web is being translated.

Embodiment 13 is the coating apparatus of embodiment 11 or 12, wherein the at least one pressurized air layer has an annular thickness in the range from about 10 micrometers to about 0.5 mm before the coating die and the roll engage with each other.

Embodiment 14 is the coating apparatus of any one of embodiments 11-13, wherein the shell comprises nickel.

Embodiment 15 is the coating apparatus of ay one of embodiments 11-14, wherein the shell has a thickness from about 0.1 mm to about 1 mm.

Embodiment 16 is the coating apparatus of ay one of embodiments 11-15, wherein the shell has a rotational moment of inertia less than 150, 100, 50, or 30 lb–in$^2$ (438, 292, 146, or 87.6 Kg–cm$^2$).

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

An experimental set-up was prepared similar to that depicted in FIG. 1. The experimental set-up included a back-up roll in the form of a thin shell of primarily nickel, 8.658 inches (21.906 cm) in diameter and 0.010 inch (0.254 mm) thick, commercially available as Nickel Shell from Stork Prints America of Charlotte, N.C.

The nickel shell was mounted around a non-rotating aluminum supporting core with a plurality of apertures. Air pressure of 40 inches of water (0.10 kg/cm) was provided to the core to support the shell.

A web of indefinite length polyethylene terephthalate (PET) 12 inches wide and 0.005 inch (0.127 mm) thick was used. The wrap of the web on the nickel shell was about 45 degrees. With the incoming web contacting the air shell at the 9 o'clock position and leaving the nickel shell at the 10:30 position.

First, the maximum web tension before touchdown was determined. Touchdown was defined as a significant decrease in oscillation in the nickel sleeve that was observed upon lateral disturbance. The web tension was adjusted to determine the maximum tension before touchdown of the nickel sleeve. The maximum tension achieved with 25 inches of water in the air core manifold was 8 lbs of tension on the 12 inch PET. The blower was increased to 50 inches of water. The maximum tension achieved was about 24 lbs on the 12 inch PET.

A slot die with a 20-mil shim was used. Adhesive liquid material commercially available from 3M Company (St. Paul, MN) was used, which has a viscosity of about 10,000 cP at a shear rate of 10 1/s and a viscosity of about 3,000 cP at a shear rate of 2,000 1/s. The adhesive was fed to the die via a gear pump. The die lips include a downstream lip with radius of 0.05" And a length of 0.02", and an upstream lip with a radius of 1.0" And a length of 0.2". The target wet coat weight was about 9 mils (approximately 0.23 mm). Line speed was varied from 5 FPM to 20 FPM.

Figure 4:
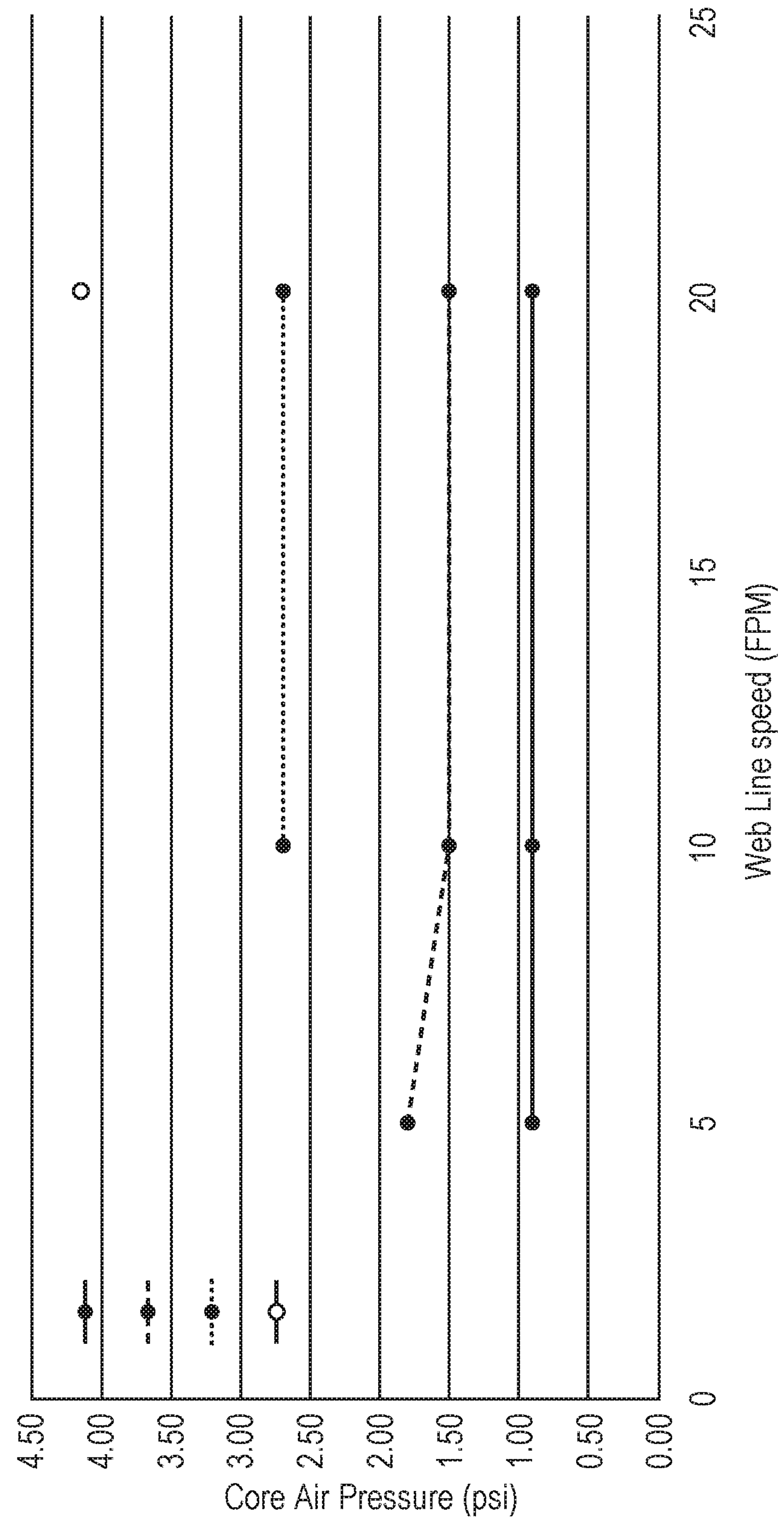
FIG. 4 is plots of core air pressure versus web line speed for different coating thicknesses.

FIG. 4 shows the minimum air shell core pressure required to establish a uniform coating. For these conditions the underbite was set to 2 mils and the die was not moved between conditions. As the wet coating thickness decreases the gap between the roll and the die required to achieve a uniform coating also decreases. Thus, FIG. 4 shows that as coating weight/thickness decreases, the minimum air pressure required increases. This implies that the position of the nickel shell relative to the die lip is controllable to some degree through adjustments in air pressure.

Minimum coating thickness was also investigated. The die position was adjusted closer to the air sleeve to provide the greatest restoring force to the coating bead. Minimum wet coating thickness achieved (calculated from flow rate) was 0.35 mils (0.009 mm). The coating was not streak free.

Table 1 shows results obtained by reducing the coating liquid flowrate while the air supplied to the core was held constant. As the coating thickness is decreased it is generally expected that the coating gap decreases to maintain a uniform coating. The data shows the position of the air sleeve adjusts dynamically in response to changes in the coat weight, enabling uniform coating at the three flow rates.

TABLE 1

| Minimum Thickness Screening | | | |
|---|---|---|---|
| Line Speed (FPM) | Flow Rate (cc/min) | Air Pressure (inches $H_2O$) | Wet thickness (mils) |
| 20 | 30 | 115 | 0.69 |
| 20 | 20 | 115 | 0.46 |
| 20 | 20 | 115 | 0.46 |
| 20 | 15 | 115 | 0.35 |

In a second experiment, the wet coating thickness was held constant and the line speed varied, with the die position held constant. As line speed is increased a higher minimum air pressure was required to stabilize the coating. Table 2 shows the minimum air pressure required to generate a uniform coating.

TABLE 2

| Required Air Pressure Required with Increasing Line Speed | | | |
|---|---|---|---|
| Line Speed (FPM) | Flow Rate (cc/min) | Air Pressure (inches $H_2O$) | Wet thickness (mils) |
| 5 | 50 | 25 | 10.17 |
| 10 | 100 | 46 | 10.17 |
| 20 | 200 | 46 | 10.17 |

Table 3 shows the coating window in mils for a variety of air sleeve pressures. The effective gap was measured as a distance between the outer surface of air core and the die lip along the radial direction at the coating zone. This shows the ability of the air sleeve system to successfully coat an adhesive 2.5 mils thick, with an effective physical gap of about 12 mils to 19 mils. The large effective gap compared to traditional fixed backup roll coating methods suggests web breaks due to confinement of the web between the slot die and the rigid back-up roll may not be a concern at lower coat weights.

TABLE 3

| Physical gap required for 2.5 mil wet coating thickness at various air pressures | | | | | |
|---|---|---|---|---|---|
| Wet Thickness (mils) | Line Speed (FPM) | Air Shell Pressure (inches of water) | Coating Window (mils) | Min Gap (mils) | Max Gap (mils) |
| 2.5 | 50 | 25 | 4 | 12 | 16 |
| 2.5 | 50 | 50 | 4 | 14 | 18 |
| 2.5 | 50 | 100 | 4 | 15 | 19 |
| 2.5 | 50 | 150 | 3 | 16 | 19 |

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments.

Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A method of coating a web, the method comprising:

providing a roll comprising a shell rotatably supported by at least one pressurized air layer between the shell and a core;

providing a coating die including one or more die lips being positioned adjacent an outer surface of the shell of the roll; and dispensing one or more coating materials from the one or more die lips of the coating die onto the web to form a coating, while translating the web in contact with the shell of the roll to rotate the shell relative to the core.

2. The method of claim 1, further comprising adjusting an air flow rate supplied to the core to form the at least one pressurized air layer.

3. The method of claim 2, wherein the air flow rate is adjusted to adjust an effective coating gap between the one or more die lips and the shell.

4. The method of claim 1, wherein the thickness of the coating is in the range from about 1 to about 500 micrometers.

5. The method of claim 1, further comprising metering a fluid flow through the coating die to control a wet thickness of the coating.

6. The method of claim 1, wherein the at least one pressurized air layer has an annular thickness in the range from about 10 micrometers to about 0.5 mm before the coating die and the roll engage with each other.

7. The method of claim 1, wherein the flexible web has one or more surface non-flatness characteristics.

8. The method of claim 7, wherein the flexible web is a baggy web.

9. The method of claim 7, wherein the one or more surface non-flatness characteristics includes a splice, a web thickness variation, or a web wrinkle.

10. The method of claim 1, further comprising wrapping the flexible web around the back-up roll.

11. A coating apparatus comprising:

a roll comprising a shell rotatably supported by at least one pressurized air layer between the shell and a core;

a coating die comprising one or more die lips being positioned adjacent an outer surface of the shell of the roll;

a flexible web disposed between the roll and the coating die; and a web path to translate the flexible web in contact with the outer surface of the shell of the roll to rotate the shell relative to the core, wherein one or more coating materials are disposed from the one or more die lips of the coating die onto the flexible web to form a coating, while the web is being translated.

12. The coating apparatus of claim 11, wherein the flexible web wraps around the roll and the contact between the flexible web and the shell drives the shell while the web is being translated.

13. The coating apparatus of claim 11, wherein the at least one pressurized air layer has an annular thickness in the range from about 10 micrometers to about 0.5 mm before the coating die and the roll engage with each other.

14. The coating apparatus of claim 11, wherein the shell comprises nickel.

15. The coating apparatus of claim 11, wherein the shell has a thickness from about 0.1 mm to about 1 mm.

16. The coating apparatus of claim 11, wherein the shell has a rotational moment of inertia less than 150 $lb\text{-}in^2$ (438 $Kg\text{-}cm^2$).

* * * * *